April 3, 1962  C. D. McGILLEM ET AL  3,028,596
RADIOMETER TECHNIQUE FOR CLASSIFYING MATERIALS
Filed June 30, 1958

INVENTORS
Clare D. McGillem &
Theodore V. Seling
BY
Paul J. Ethington
ATTORNEY

United States Patent Office 3,028,596
Patented Apr. 3, 1962

3,028,596
RADIOMETER TECHNIQUE FOR CLASSIFYING MATERIALS
Clare D. McGillem, Flint, and Theodore V. Seling, Davison, Mich., assignors to General Motors Corporation, Detroit, Mich., a corporation of Delaware
Filed June 30, 1958, Ser. No. 745,762
9 Claims. (Cl. 343—100)

This invention relates to radiometer techniques and more particularly to method and apparatus for identifying the materials of objects detected by such systems.

Radiometer systems have been devised for detecting the presence of objects by measuring the electromagnetic radiation from such objects. The radiated energy from a body at a temperature above absolute zero extends throughout the frequency spectrum and the distribution of energy as a function of wave length and temperature of the radiating body is known. The radiated energy at a given frequency for an ideal black body radiator is primarily a function of its absolute temperature but the radiated temperature from a non-black body radiator depends also upon its radiation efficiency. Consequently, different bodies at the same absolute temperature radiate different amounts of energy. Therefore, it is possible with a highly directive antenna to scan a background area, such as the earth's surface, to detect the presence of objects having the same physical temperature as the earth but having a different radiation efficiency. By this technique, a signal voltage is developed corresponding to each object within the background area and the signal voltage may be utilized to construct a map of the objects within the area. The majority of the radiated energy from a body is concentrated in the infrared portion of the spectrum while a much lower level of energy exists in the radio frequency spectrum. The radiated energy at the microwave frequency, for example, above 600 megacycles, is of a low order of magnitude but it is highly advantageous to employ receiving systems operating in this portion of the spectrum. A microwave radiometer system of the type referred to is described and claimed in the copending patent application S.N. 745,760 filed on even date herewith for "Microwave Radiometer System" by Theodore V. Seling and assigned to the assignee of this invention. Although the present invention will be described with reference to a microwave radiometer system, it will be apparent as the description proceeds that the method and apparatus of this invention are also applicable to radiometer systems operating in other portions of the frequency spectrum including the infrared.

It is a principal object of this invention to provide method and apparatus to classify material types of detected objects by measuring and analyzing the thermal radiation therefrom. The apparent temperature of objects as measured by a radiometer is a function of the electrical properties of the material of the object and the various parameters entering into the measurement. In infrared radiometers, the apparent temperature of an object is determined largely by the physical temperature of the object whereas in a radio frequency radiometer the apparent temperature is determined primarily by the electrical properties of the material and secondarily by the physical temperature of the object. Using conventional radiometer techniques, a difference in material types, cannot be discerned because the various material and measurement parameters can combine to give the same apparent temperature for different materials. However, it has been found that the measurement parameters may be changed to produce a change of apparent temperature and only materials having identical material parameters will produce the same apparent temperature change. Thus, in accordance with this invention, the material of an object being measured may be classified and identified within certain limits by a technique including the measurement of apparent temperature and apparent temperature change corresponding to a given change of measurement parameters.

A more complete understanding of this invention may be had from the detailed description which follows taken from the accompanying drawings in which.

In the radio frequency spectrum, the apparent temperature of an object is determined by the parameters of the material and the parameters of the temperature measurement. The most important material parameters, in addition to physical temperature, are the dielectric constant, the permeability and the conductivity of the material. The measurement parameters include controlled parameters such as the frequency and the polarization of the detected energy and the angle of viewing or incidence of the detector with reference to the surface of the object. There are also certain uncontrolled parameters of the measurement such as object environment including atmospheric attenuation which influence apparent temperature since it is determined by both direct radiation and reflection. For example, in a microwave radiometer system such as that described in the aforementioned patent application, the apparent temperature of the earth is about 285° K. while the apparent temperature of a metal surface is about 9° K. and the effective temperature of a body of water is about 111° K. The materials of these bodies have widely different apparent temperatures and taking the earth as a background or reference temperature, the metal surface has a differential temperature of —276° K. and the body of water has a differential temperature of —174° K. Such materials with widely different characteristics may be readily distinguished from each other. However, other objects of different materials, such as the roadway materials of asphalt and concrete have about the same differential temperatures even for identical measurement parameters. Such materials are not distinguishable from each other on the basis of differential temperature alone because a measurement parameter such as angle of incidence may be different for the two materials in a given measurement or the uncontrolled parameters may be different for successive measurements. Accordingly, the apparent temperature of an object, and hence its differential temperature, may vary over a considerable range of values and the apparent temperature alone is not sufficient to identify the material type.

However, when a temperature measurement is taken with one of the controlled measurement parameters at a selected value and repeated at a different selected value, the remaining measurement parameters being held constant during both measurements, the change of apparent temperature is substantially constant or varies within a very narrow range despite differences in uncontrolled measurement parameters. Thus a characteristic temperature change for an associated controlled parameter change is determined for a given material. This characteristic temperature change when correlated with an apparent temperature range of a particular material provides sufficient information to identify a selected object as being of a certain material type.

Figure 1:
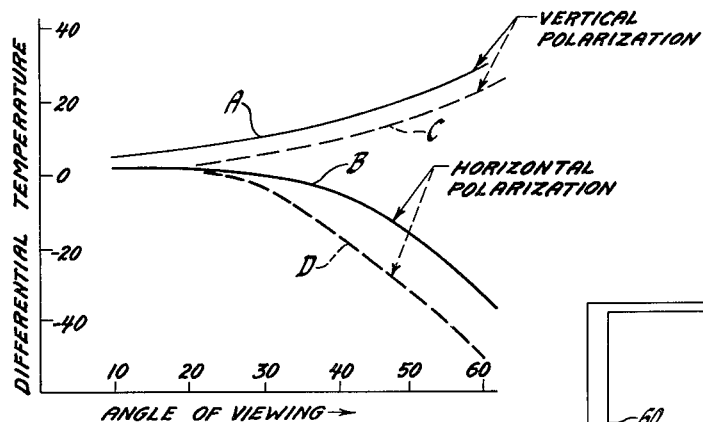
FIGURE 1 shows the differential temperature for two different materials as a function of angle of viewing for both vertical and horizontal wave polarization.

Consider a specific example as illustrated in FIGURE 1 showing the differential temperatures of two roadway materials as a function of angle of incidence for vertical and horizontal wave polarizations. The differential temperature of blacktop asphalt when measured with a microwave radiometer receiving vertically polarized waves is represented by solid line curve A. For the same system receiving horizontally polarized waves, the differential temperature is represented by the solid line curve B. For a surface of concrete, the differential temperature for vertical polarization is represented by the dashed line curve C and for horizontal polarization, by the dashed line D. At a typical angle of incidence, for example 45°, and at a given measurement frequency, the asphalt surface will have a differential temperature of 15° K. for vertical polarization and given conditions of uncontrolled measurement parameters. For horizontal polarization, it will have a differential temperature of −10° K. These values of differential temperature for a different set of controlled parameters will vary over a considerable range as the uncontrolled measurement parameters change. The differential temperature for vertical polarization may have a range from +10 to +20 degrees K. while that for horizontal polarization may vary from −5° K. to −15° K. However, the change of measured differential temperature occasioned by the change from vertical to horizontal polarization will remain substantially constant for different values of uncontrolled measurement parameters and for the asphalt surface the characteristic temperature change is 25° K. For the concrete surface under the same measurement conditions, the differential temperature for vertical polarization is +10°, but it may vary between +5 and +15° for different conditions, and for horizontal polarization the differential temperatures is −22°, but it may vary between −17° and −27°. The concrete will have a characteristic temperature change of 32°. Therefore, even though the differential temperature values for asphalt and concrete surfaces may be the same for certain measurement conditions, the two materials can be distinguished from each other when the characteristic temperature change is correlated with the differential or apparent temperature value. If temperature measurements are taken of a selected object known to be either concrete or asphalt and the object has an apparent temperature for vertical polarization of +12° K., the two materials could not be distinguished on this basis since the differential temperature falls within the range of either material. However, if the specific temperature change incident to the change from vertical to horizontal polarization measurement is 32° K., the material is then known to be concrete since this corresponds to the characteristic temperature change of a concrete surface.

Accordingly, in practicing this invention, data for a selected group of materials is taken for a given kind of radiometer system. For each material in the group, the apparent temperature is measured and recorded at two different values of one controlled measurement parameter while the remaining controlled measurement parameters are held at constant values to determine the characteristic temperature change for the material. Also the differential temperature of each material is recorded for different values of uncontrolled measurement parameters to determine the range of variation of apparent temperatures. For subsequent measurements any object of a material within the group may be identified as to material type by measurements of its specific temperature change and its differential temperature. The temperature data for the group of materials may be recorded in any convenient manner, such as in chart form, for manual correlation of temperature measurements therewith or the data may be recorded and stored in mechanical or electronic data storage devices, such as magnetic drums, punch cards or the like for automatic correlation with temperature measurements.

Referring now to the remaining figures in the drawings, there are shown illustrative embodiments of microwave radiometer systems incorporating means for material identification in accordance with the foregoing method. Since the components of the systems are conventional or well known to those skilled in the art, the systems are represented in block diagram. The radiometer receivers which will be referred to are suitably of the type described in the aforementioned copending patent application.

Figure 2:
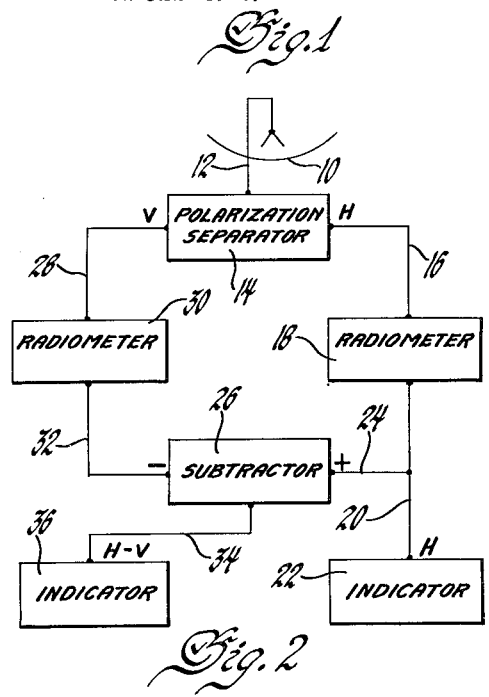
FIGURE 2 is a block diagram of a radiometer system for material classification by means of polarization discrimination.

In the system of FIGURE 2, the controlled measurement parameters of frequency and angle of incidence remain constant and the measurement is taken at different wave polarizations, namely, horizontal and vertical in order to determine the specific temperature change of a selected object. The system comprises a microwave antenna 10 which is of the circularly polarized horn-fed type with a parabolic reflector and is circularly polarized to receive both vertical and horizontal polarizations of radiated waves with equal efficiency. The antenna is connected through a waveguide 12 to the input of a polarization separator 14. The output of the separator 14 corresponding to the horizontally polarized wave H is applied through waveguide 16 to the input of a radiometer 18. The radiometer 18 develops an output signal voltage having an amplitude and phase which corresponds to the magnitude and sign of the differential temperature of the object (i.e., the apparent temperature relative to the background temperature). This output voltage is applied through conductor 20 to a bipolar indicator 22 which presents the value of the differential temperature of the object for horizontal polarization. The output of the radiometer 18 is also applied through conductor 24 to one input of the subtractor circuit 26, suitably a differential amplifier, for a purpose to be described presently. The other output of the polarization separator 14, corresponding to the vertically polarized waves, from the object is applied through waveguide 28 to the input of a radiometer 30. This radiometer develops an output signal voltage corresponding in amplitude and phase to the magnitude and sign of the differential temperature of the object for horizontal polarization. This output voltage is applied through conductor 32 to the other input of the subtractor circuit 26. The subtractor circuit algebraically combines the input voltages to develop an output voltage having an amplitude and phase corresponding to the difference of the input voltages. This output voltage is applied through conductor 34 to the input of a bipolar indicator 36 which presents an indication of the value of the temperature change of the object occasioned by the difference between horizontal and vertical polarizations. In the operation of the system of FIGURE 2, the temperature data including the characteristic temperature change and the apparent temperature range, as previously described, may be recorded for each of a group of objects of known material types. When it is desired to locate or construct a thermal map of objects within a selected area known to contain objects of such material types, the indications of both indicators 22 and 36 are noted and compared with the recorded temperature data to identify a particular object. Alternatively, the temperature indications presented by indicators 22 and 36 may be continuously recorded; for example, on a magnetic tape recorder for later processing by digital or analog equipment to obtain a complete analysis of the recorded data.

Figure 3:
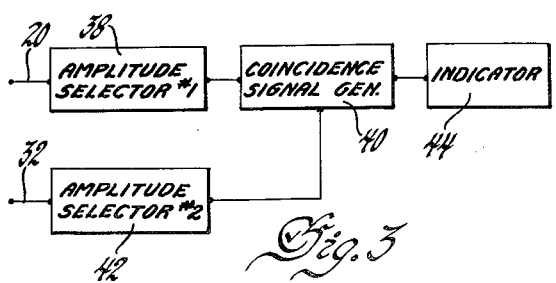
FIGURE 3 is a block diagram of a system for automatic classification of material types.

In systems where it is desired to show on the indicator only the presence of certain material types the system of FIGURE 2 may be combined with a selective system as shown in FIGURE 3. This system comprises an amplitude selector 38 having its input connected to the output of receiver 18 by conductor 20. The amplitude selector 38 responds only to signal voltages having an amplitude within a given range of values to develop an output voltage. The output voltage of the amplitude selector 38 is applied to one input of a coincidence signal generator 40. An amplitude selector 42 has its input connected to the output of receiver 30 through the conductor 32 and responds only to a predetermined range of amplitude values for developing an output voltage which is applied to the other input of the coincidence signal generator 40. The coincidence signal generator 40 develops an output voltage only in response to the simultaneous application of input voltages to develop an output voltage which is applied to an indicator 44. In operation of the system of FIGURE 3, it may be desired to indicate the presence of only concrete surfaces within a selected area. For this purpose, the amplitude selector 38 is adjusted to respond only to voltage amplitudes corresponding to the differential temperature range for concrete surfaces. The amplitude selector 42 is adjusted to respond only to voltages having amplitude corresponding to the characteristic temperature change of concrete surfaces. Accordingly, the coincidence signal generator 40 will be non-responsive to objects of different material types and the indicator 44 will provide an indication only of concrete surfaces.

Figure 4:
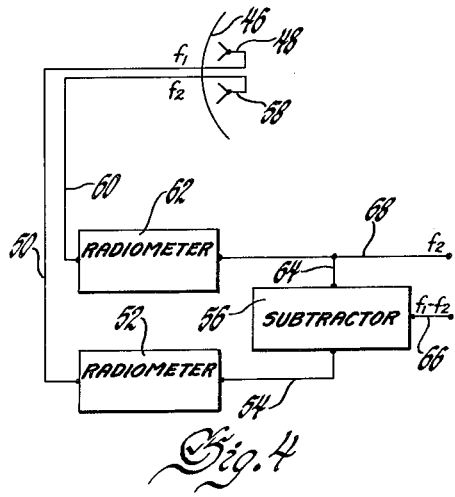
FIGURE 4 is a block diagram of a radiometer system for material classification using frequency discrimination.

In FIGURE 4, there is shown a system wherein the material of an object is identified by measuring its differential temperature at two different frequencies to obtain the characteristic temperature change and correlating this with its differential temperature at one of the two frequencies. This system comprises a receiving antenna 46 having an antenna feed horn 48 tuned to a first frequency $f_1$ and coupled through a waveguide 50 to a radiometer 52. The radiometer 52 develops a signal voltage having amplitude and phase corresponding to the magnitude and sign of the differential temperature of the object at measurement frequency $f_1$. This output voltage is applied through conductor 54 to one input of the subtractor circuit 56. The antenna 46 also has a feed horn 58 tuned to a frequency $f_2$ which is coupled through waveguide 60 to the input of the radiometer receiver 62. The radiometer 62 develops an output signal voltage corresponding to the measurement and sign of the differential temperature at frequency $f_2$ which is applied through conductor 64 to the other input of the subtractor circuit 56. Accordingly, the subtractor circuit 56 develops an output voltage on conductor 66 which corresponds in amplitude and phase to the algebraic difference of the differential temperatures and which corresponds to the characteristic temperature difference of the object for measurement frequencies $f_1$ and $f_2$. The conductor 66 is connected with an indicator to indicate the value of temperature change and the output of radiometer receiver 62 is connected through conductor 68 to an indicator to indicate the value of apparent temperature at the measurement frequency $f_2$. This combined information is sufficient for identification of material type of the object.

Figure 5:
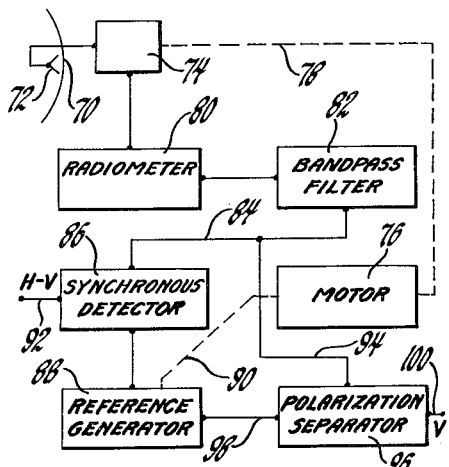
FIGURE 5 is a block diagram of a radiometer system for material classification using continuous variation of polarization.

In FIGURE 5, there is shown a system for developing the characteristic temperature as a function of polarization change by the use of a single radiometer receiver. This system comprises a receiving antenna 70 having a rotatable antenna feed horn 72 which is coupled through a waveguide rotary joint 74 to a receiver 80. The feed horn 72 is rotatably driven at constant speed by a motor 76 through a mechanical coupling 78. Thus the polarization of the antenna is continuously rotated through the vertical and horizontal polarizations and the radiometer develops an output signal voltage having an instantaneous value corresponding to the differential temperature of the object for the existing polarization of the antenna. This signal voltage is applied through a bandpass filter 82 and through conductor 84 to the input of the synchronous detector 86. The synchronous detector, such as a conventional chopper, is energized in synchronism with the rotation of the antenna feed horn by a reference generator 88 driven synchronously with the antenna feed horn by the motor 76 through the mechanical coupling 90. Accordingly, the synchronous detector develops an output voltage on conductor 92 which corresponds to the algebraic difference of the radiometer signal voltage for horizontal and vertical polarizations. Thus this output voltage of the synchronous detector corresponds to the temperature change of the material for the polarization change from horizontal to vertical. The radiometer output signal voltage applied through bandpass filter 82 is also applied through conductor 94 to the input of a polarization separator 96. The separator 96 is energized in synchronism with rotation of the antenna feed horn by the reference generator 38 through the conductor 98. The energization of the separator 96 is phased with the feed horn rotation so that the radiometer signal voltage is passed by the separator and appears on output conductor 100 only during the vertical polarization of the antenna feed horn so that the output voltage corresponds to the differential temperature of the object for vertical polarization. The output conductors 92 and 100 may be connected to respective indicators to indicate the temperature change of the object and the apparent temperature of the object to identify the material type.

Although this invention has been described with respect to a particular embodiment, such description is not to be construed in a limiting sense. Numerous modifications and variations within the spirit and scope of the invention will now occur to those skilled in the art. For a definition of the invention, reference is made to the appended claims.

We claim:

1. The method of classifying objects of radiometric temperature measurement in accordance with material types comprising the steps of developing a first signal voltage corresponding to the apparent temperature of the objects for one value of a selected measurement parameter while holding other selected measurement parameters at constant value, developing a second signal voltage corresponding to the apparent temperature of the objects for a different value of the selected measurement parameter while holding said other selected measurement parameters at said constant value, subtracting one of the signal voltages from the other to develop a resultant signal voltage corresponding to the apparent temperature change for the selected parameter, selecting the resultant signal voltages of predetermined value, and selecting those first signal voltages falling within a predetermined range of values concurrently with said predetermined value of the resultant signal voltage to identify the object corresponding to the selected voltages as being of a particular material type.

2. The method of identifying the material type of objects by radiometric temperature measurements comprising the steps of selecting a group of objects of known material type, radiometrically measuring the apparent temperature of each object at two different values of one controlled measurement parameter while holding other selected controlled measurement parameters at constant value to obtain a characteristic temperature change, recording the characteristic temperature change for each object, radiometrically measuring the apparent temperature of each object at one of the two different values of said one controlled measurement parameter while holding said other remaining controlled measurement parameters at constant value, repeating the last-mentioned measurement of each object for different values of uncontrolled measurement parameters to obtain a range of variation of apparent temperature, recording the apparent temperature range for each object, radiometrically measuring the apparent temperature of an object of the group at said two different values of said controlled measurement parameter while holding the remaining controlled measurement parameters at said constant value to obtain a specific temperature change and a specific apparent temperature, and comparing the specific temperature change with the characteristic temperature change and comparing the specific apparent temperature with the apparent temperature range to identify the material type of the object.

3. The method of identifying the material type of objects by radiometric temperature measurements comprising the steps of selecting a group of objects of known material type, radiometrically measuring the apparent temperature of each object at two different radiated wave polarizations while holding other selected controlled measurement parameters at constant value to obtain a characteristic temperature change, recording the characteristic temperature change for each object, radiometrically measuring the apparent temperature of each object at one of the radiated wave polarizations while holding said other selected controlled measurement parameters at constant value, repeating the last-mentioned measurement of each object for different values of uncontrolled measurement parameters, recording the apparent temperature range for each object of the last-mentioned measurement, radiometrically measuring the apparent temperature of an object of the group at said two different wave polarizations while holding said other selected controlled measurement parameters at said constant value to obtain a specific temperature change and a specific apparent temperature, and comparing the specific temperature change with the characteristic temperature change and comparing the specific apparent temperature with the apparent temperature range to identify the material type of the object.

4. The method of identifying the material type of objects by radiometric temperature measurements comprising the steps of selecting a group of objects of known material type, radiometrically measuring the apparent temperature of each object at two different frequency bands while holding other selected controlled measurement parameters at constant value to obtain a characteristic temperature change, recording the characteristic temperature change for each object, radiometrically measuring the apparent temperature of each object at one of the two frequency bands while holding said other controlled measurement parameters at constant value, repeating the last-mentioned measurement of each object for different values of uncontrolled measurement parameters, recording the apparent temperature range for each object of the last-mentioned measurement, radiometrically measuring the apparent temperature of an object of the group at said two different frequency bands while holding said other remaining controlled measurement parameters at said constant value to obtain a specific temperature change and a specific apparent temperature, and comparing the specific temperature change with the characteristic temperature change and comparing the specific temperature with the apparent temperature range to identify the material type of the object.

5. A system for classifying objects of radiometric temperature measurement in accordance with material types comprising means for developing a first signal voltage corresponding to the apparent temperature of an object for one value of a selected measurement parameter, means for developing a second signal voltage corresponding to the apparent temperature of the object for a different value of the selected measurement parameter, means for subtracting one of the signal voltages from the other to develop a resultant signal voltage corresponding to the apparent temperature change for the selected parameter, means for indicating the value of the resultant signal voltages, and means for indicating the value of the first signal voltages, whereby the indicated values may be correlated to identify the object as being of a particular material type.

6. A radiometer system for identifying material types of detected objects comprising an antenna for receiving energy radiated from a selected object at two different values of a selected measurement parameter, a first radiometer having its input connected to the antenna and responsive to the energy corresponding to one value of the selected parameter for developing a first signal voltage having an amplitude and phase corresponding to the magnitude and sign of the differential apparent temperature of the object, a second radiometer having its input connected to the antenna and responsive to the energy corresponding to the other value of the selected parameter for developing a second signal voltage having an amplitude and phase corresponding to the magnitude and sign of the differential temperature of the object, indicating means connected with the output of the first receiver to indicate the value of apparent temperature of the object corresponding to the one value of the selected parameter, subtracting means having one input connected to the output of one radiometer and having its other input connected to the output of the other radiometer and developing an output voltage corresponding to the algebraic difference of said signal voltages, and indicating means connected to the output of the subtracting means to indicate the change of apparent temperature of said object arising from the difference of the values of said selected parameter.

7. A radiometer system for identifying material types of detected objects comprising a circularly polarized antenna for receiving energy radiated from a selected object, a polarization separator having its input connected with said antenna, a first radiometer having its input connected to a first polarization output of the separator and developing a first signal voltage having an amplitude and phase corresponding to the magnitude and sign of the differential apparent temperature of the object at said first polarization, a second radiometer having its input connected to a second polarization output of the seperator and developing a second signal voltage having an amplitude and phase corresponding to the magnitude and sign of the differential apparent temperature of the object at said second polarization, indicating means connected with the output of the first radiometer to indicate the value of apparent temperature at said first polarization, subtracting means having one input connected to the output of one radiometer and having its other input connected to the output of the other radiometer and developing an output voltage corresponding to the algebraic difference of said signal voltages, and indicating means connected to the output of the subtracting means to indicate the change of apparent temperature of said object arising from the difference of polarization of measurement.

8. A radiometer system for identifying material types of detected objects comprising an antenna including a first antenna feed for receiving energy radiated from a selected object at a first frequency band and a second antenna feed for receiving energy radiated from the selected object at a second frequency band, a first radiometer having its input connected to the first antenna feed and developing a first signal voltage having an amplitude and phase corresponding to the magnitude and sign of the differential apparent temperature of the object, a second radiometer having its input connected to the second antenna feed and developing a second signal voltage having an amplitude and phase corresponding to the magnitude and sign of the differential apparent temperature of the object, indicating means connected with the output of the first radiometer to indicate the value of apparent temperature of the object corresponding to the first frequency band, subtracting means having one input connected to the output of one radiometer and having its other input connected to the output of the other radiometer and developing an output voltage corresponding to the algebraic difference of said signal voltages, and indicating means connected to the output of the subtracting means to indicate the change of apparent temperature of said object arising from the difference of the measurement frequencies.

9. A radiometer system for identifying material types of detected objects comprising an antenna for receiving energy radiated from a selected object, driving means for continuously changing the polarization of said antenna, a radiometer having its input connected to the output of the antenna and developing a signal voltage having an amplitude and phase corresponding to the magnitude and sign of the differential apparent temperature of the object for the existing polarization, a polarization separator having its input connected with the output of the radiometer, means for actuating the separator synchronously with the driving means for developing an output voltage having an amplitude and phase corresponding to the magnitude and sign of the differential apparent temperature of the object at a first polarization, indicating means connected with the output of the polarization separator, detector means connected with the output of the radiometer and actuated synchronously with said driving means for developing an output voltage corresponding to the algebraic difference of the signal voltage for two different polarizations, and indicating means connected to the output of the detector means to indicate the change of apparent temperature of said object arising from the difference of polarization of measurement.

References Cited in the file of this patent

UNITED STATES PATENTS

| | | |
|---|---|---|
| 2,428,351 | Ayres | Oct. 7, 1947 |
| 2,773,253 | Sunstein | Dec. 4, 1956 |